June 19, 1956 G. A. BRONSON 2,750,929
CYCLE CONTROL VALVE FOR HYDRAULIC MOTORS
Filed Aug. 27, 1951 2 Sheets-Sheet 1

INVENTOR.
GEORGE A. BRONSON
BY
Edwin Coates
ATTORNEY

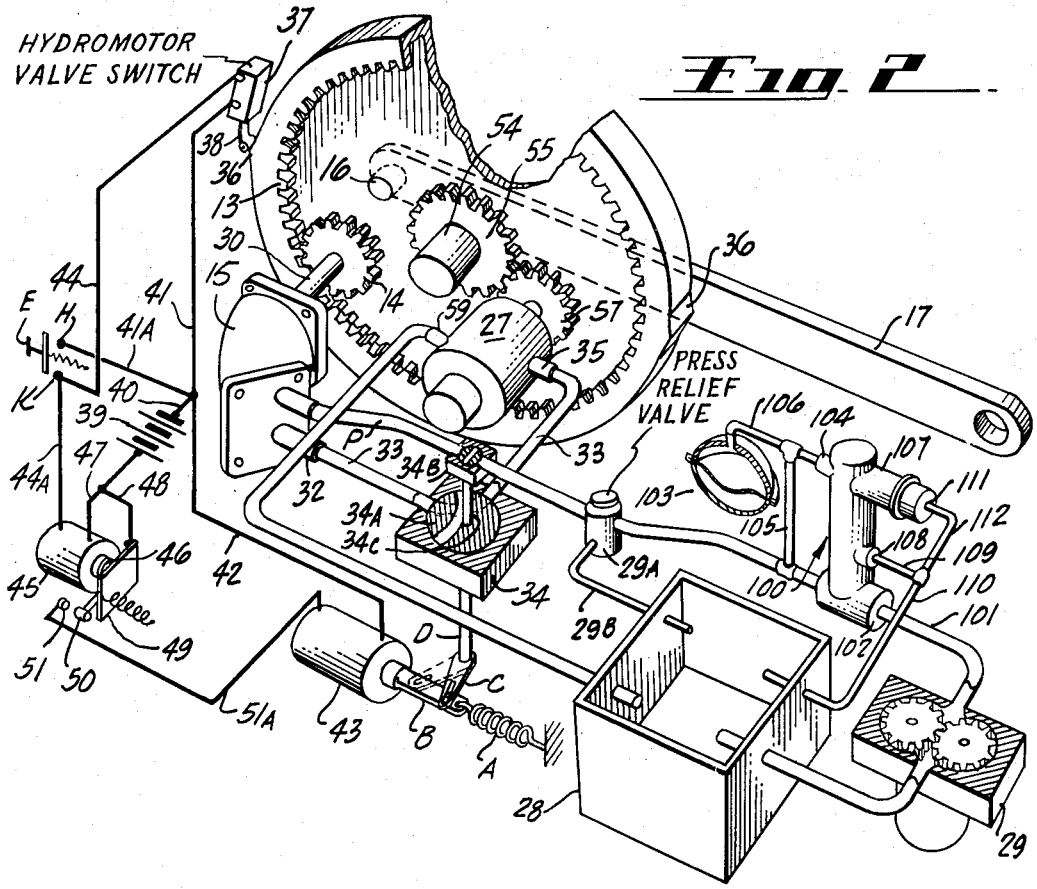
Fig. 2
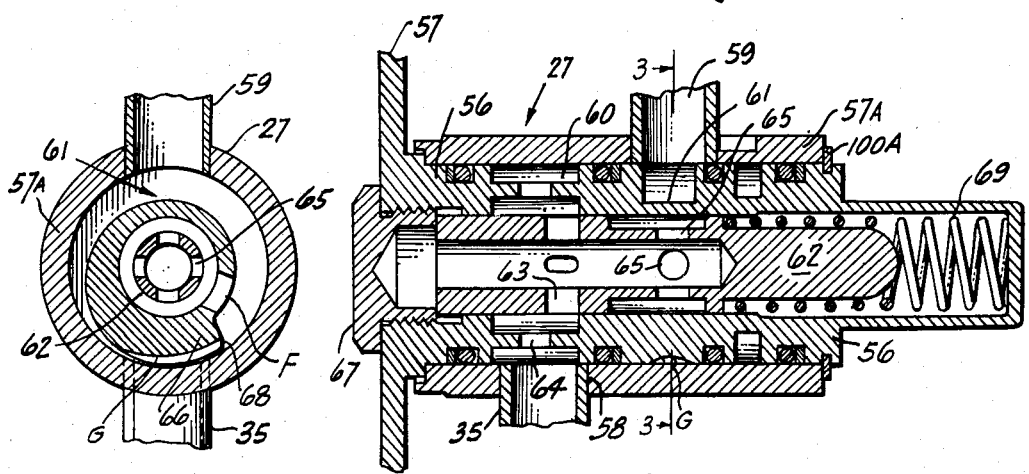
Fig. 3
Fig. 4
INVENTOR.
GEORGE A. BRONSON
BY
J. Edwin Coates
ATTORNEY

United States Patent Office 2,750,929
Patented June 19, 1956

2,750,929

CYCLE CONTROL VALVE FOR HYDRAULIC MOTORS

George A. Bronson, Santa Monica, Calif., assignor to Douglas Aircraft Company, Inc., Santa Monica, Calif.

Application August 27, 1951, Serial No. 243,837

22 Claims. (Cl. 121—44)

This invention relates to control mechanism for drive systems, its principal object being to provide means for cyclically varying the effective power output of the prime mover of the drive system from an initial maximum at the beginning of each half cycle and gradually diminishing this power throughout each half cycle of the movement of the driven device to a terminal position at the end of each half cycle.

Among the many advantageous results produced by this cyclic control is the fact that the driven device is started with a comparatively high initial velocity, thereby among other things to rapidly clear it out of the path of objects that have to be moved transversely of the path of the driven member or movable device such as, for example, a bomb bay door which has to be quickly moved out of the path of a falling bomb. A concomitant advantage lies in the fact that, by virtue of the gradual diminution of the effective power output of the prime mover, starting at a predetermined point of the movement of the cyclically driven member, the object driven by the present system is brought gradually to rest in its half cyclic position, thereby obviating impact shocks upon the object or upon its terminal abutment.

For purposes of exemplification, the invention will be disclosed in connection with a rotary hydraulic motor driving cyclic power transmission means, the latter means opening and closing the bomb bay doors of an airplane, but it will become apparent that the invention is by no means limited to a rotary hydraulic motor or to drive systems for bomb bay doors.

To accomplish its object, subject invention primarily provides, in a drive system in which the prime mover is a rotary hydraulic motor, a fluid flow metering device so constructed and so configured with the prime mover energizing fluid system as to allow free passage of the fluid through the motor in the initiation of its cycle, thereby to permit the prime mover to be initially operated with a relatively high angular acceleration and velocity and with a relatively high torque. In the cases where the fluid-controlling device is a fluid metering and back pressure creating valve, such as a cycle control valve, the valve is constructed to apply no back pressure to the motor at the outset of its half cycle of operation, thereby to enable the energizing fluid to operate the motor at full speed.

The device for controlling the maximum and minimum flow rates of the prime mover energizing fluid, and hence controlling the power output or power factor of the prime mover, is also of such a construction as to apply a flow rate diminishing action to decelerate the prime mover near the end of each half cycle of movement of the power transmission means, here shown as a ring gear, that is, near the end of the prescribed path of movement of the object, such as a bomb bay door, to be moved by the present system.

In the present embodiment, this controlling device takes the form of a fluid metering and back pressure creating valve and constitutes a cycle control valve. It applies its flow rate controlling and back pressure creating effect on the energizing fluid path of the prime mover, and preferably directly on the exhaust fluid path from the prime mover, near the end of each half cycle of the power transmission means such as a ring gear and near the end of the path of movement of the object to be moved. It so acts as to cause the prime mover to begin to decelerate at a predetermined point in the half cycle aforementioned, and continues to decelerate the prime mover until the end of the half cycle aforementioned and thus starts the driven object rapidly but brings the driven objects, such as bomb bay doors, gradually to rest, thereby eliminating sudden impact shocks on either the bomb bay doors or their abutments or supports.

Since the invention contemplates that the power transmitting device driven by the hydraulic motor and in turn driving the bomb bay doors be of the cyclically operating type, such as a ring gear driving a reciprocating mechanical movement, means independent of the aforementioned prime mover power output controlling valve are provided for halting the rotation of the prime mover and the ring gear at predetermined points of their cycle of operation, these points preferably being located at half cycle phases of rotation of the ring gear and operationally coinciding with the open and closed positions of the bomb bay doors. Means are also provided for restarting the prime mover and ring gear in order to initiate the next half cycle of operations.

The aforesaid prime mover stopping-means automatically become operative at the ends of the respective paths of movement of the bomb bay doors. Broadly speaking, they may comprise normally open valvular means for controlling the exhaust flow path from the prime mover and therefore the circulation therethrough. These means are interposed in the exhaust fluid flow path that extends from the prime mover to the pressure fluid source, the valvular member including a core member shiftable between the exhaust fluid path opening position and an exhaust closing position thereby to stop circulation of the energizing fluid through the motor and halt the motor. These motor stopping means also include another source of energy, independent of the pressure fluid source; periodically energized means for actuating the motor stopping and starting valve and normally flow connected with said independent source of energy and the actuating means including an outwardly spring urged member operatively connected to the value core in such a manner as to position the core in that position which maintains the exhaust flow path open; tripping means, such as tapered nodes, located at half cycle intervals of the periphery of the cyclically movable member, here a ring gear, and a normally closed energy flow interrupting means, such as a switch, connected in series in the connection that extends from the independent energy source to the valve actuating means. The flow interrupting means are disposed in operative adjacency to the nodes and are actuatable by the latter to deactivate the spring tensioned member in the valve actuating means at the ends of the half cycles defined by said nodes. This action closes the exhaust fluid path, stops circulation of energizing fluid through the motor and naturally stops the motor at the ends of the aforesaid half cycles. The prime mover energizing fluid path also includes in the pressure line leading to the prime mover, a flow control valve so coupled to the prime mover starting and stopping valve as to be opened and closed concurrently with the opening and closing of the motor starting and stopping valve. Its purpose is to relieve the motor of the unbalanced force condition set up by the very high back pressure in the exhaust from the motor and the lower pressure in the inlet to the prime mover when the motor is not rotating. However, this valve enables pressure fluid to be freely applied to the prime mover when the motor starting and stopping valve is open for energizing the motor.

Just prior to the aforesaid stoppages of the prime mover, the rotary exhaust fluid metering and back pressure applying means, that is, the cycle control valve, being flow connected to the exhaust fluid path beyond the motor starting and stopping valve therein and drivenly connected to the ring gear for phased rotation in order to control the rate of flow through the prime mover by metering the exhaust fluid and applying back pressure thereto gradually from the beginning of the half cycle to the maximum at the end of the half cycle, effects sufficient diminution of the rate of flow of fluid through the prime mover and exerts sufficient back pressure on the prime mover to apply the desired deceleration to the prime mover, to the ring gear and to the driven object. Thus the cycle control valve continuously controls the flow rate of the energizing fluid from maximum rate obtaining at the beginning of each half cycle and gradually reduces this rate therefrom to a minimum rate at the end of each half cycle and just before the stoppage of the prime mover, reducing the flow rate almost to zero. Each half cycle, of course, ends in the opening or closing of the bomb bay doors, as the case may be.

To initiate the next half cycle, that is, to start the prime mover and hence close or open the bomb bay doors, a normally open energy flow conducting path, containing a hand closure switch, and adapted for energizing the motor valve closing and opening means, is shunted in the aforesaid energizing path for the actuating means that is connected in series with said independent energy source. The normally open switch means in this auxiliary circuit is hand closed at the end of each cycle or upon the stoppage of the prime mover and energizes the aforesaid valve actuating means and opens the exhaust controlling valve and the pressure inlet valve in the motor energizing circuit in order to restart the prime mover.

For the purpose of further clarifying the invention, one of the presently preferred embodiments of the system, including the cycle control valve, is described hereinafter in conjunction with a bomb-bay door operating system and is illustrated in the accompanying drawings.

In these drawings:

Figure 2 is a perspective of a complete drive and control system operating these doors, showing the hydraulic and electric control arrangement of the present invention associated with a hydraulic motor for operating the drive mechanism;

Figure 3 is a transverse sectional view, taken on line 3—3 of Figure 4, showing the internal construction of the motor power output controlling device that is shown associated with the motor in Figure 2;

Figure 4 is a longitudinal section of the motive power controlling device shown in cross section in Figure 3.

Figure 1:
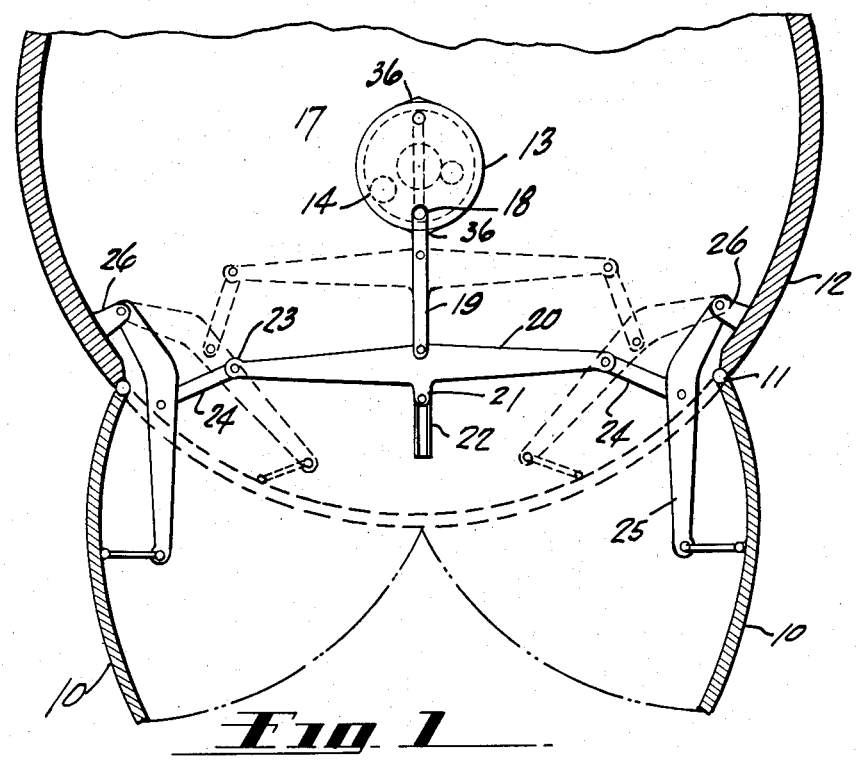
Figure 1 is a diagrammatic cross-sectional view of the lower portion of an airplane bomb-bay in which the control means of the invention can be employed with the drive means shown for opening and closing the bomb bay doors.

The bomb bay door operating system shown in Figure 1 the motive means of which are controlled by the present means, comprises a pair of bomb bay doors 10 suitably hinged at pivotal points 11 to the belly of a fuselage 12 for movement from the dotted line position, to the solid line position and vice versa.

Since the doors must quickly start their opening movement to clear the path for the bombs as soon as possible, yet terminate this movement slowly, but since power transmission from the hydraulic motor to the driven member is at a fixed ratio, the invention provides means for cyclically controlling the maximum and minimum rate of flow of motor energizing fluid through the motor, thereby to control the effective power output of the motor from maximum to minimum in cyclic operation, as well as means for stopping and starting the motor at the completion of the door opening and closing movements.

To effectuate the aforementioned movements of the doors, a rotary drive gear 13 of the ring type is provided and is driven by a spur gear 14. Spur gear 14 is rotated by a hydraulic motor 15 shown in Figure 2 and meshes with the ring gear at a predetermined gear ratio. For one of the presently preferred embodiments, the ratio is of the order of 1 to 4. The one face of the ring gear pivotally supports at 16 the one end of a link 17, which end it carries around with it when it rotates, the other end of the link being pivotally attached at point 18 to the upper end of a link 19. The link 17 is thereby constrained to exert upward and downward force on the link 19. The lower end of link 19 is pivotally attached to a cross head 20, which is adapted by means of a guide block 21 to reciprocate in a guide 22 under the vertical action of the links 17 and 19. The outer ends 23 of the cross head 20 pivotally bear the inner ends of links 24 the outer ends of which are pivotally attached to the apices of angled actuating arms 25. The upper ends of these arms 25 are pivotally mounted by brackets 26 on the inside wall of the fuselage, while the lower ends of the arms are pivotally linked to the insides of the bomb bay doors. Thus, when the power is applied at the input end of the system, the rotary motion thereat is transformed into the reciprocatory motion of the cross head and transmitted to the doors and there transformed into the oscillatory opening and closing motion of the doors. The motor and rotary ring gear are both of a non-reversing nature and continuously operate in the same direction of rotation, the reciprocatory motion of the connecting rods and cross head, however, reversing in direction at every 180° of the rotation of the ring gear and consequently at the end of every second rotation of the motor, since the motor is geared 1 to 4 to the ring gear. The motor fluid flow rate and cycle controlling valve of this invention exerts its maximum flow-rate control and back pressure on the motor at the end of every second rotation of the motor, at the end of every rotation of the cycle control valve, and at the end of every half-revolution of ring gear 13.

In accomplishing its function, the motor is supplied with pressure fluid from a source or reservoir 28 from which the fluid is drawn by means of a pump 29 and entrained into the inlet of the motor 15. The power output shaft 30 of the drive motor is drivingly engaged with the ring gear by means of the spur gear 14 on the motor output shaft meshed with the ring gear 13.

The motor exhaust fluid emerges through an outlet fitting 32 and is led by a conduit 33 to a two-position "flow" and "no-flow" valve 34 having a core 34A which, in the dotted line position, conducts the exhaust fluid to the inlet 35 of the cycle control valve 27, constituting the principal component of this invention, and thence back to the reservoir. In the solid line position, the core of the valve 34 prevents circulation of energizing fluid through the motor and hence stops the rotation of the motor, as hereinafter described. The pressure inlet line P of the motor contains a two-way valve 34B, the core of which is connected by an operating link 34C to the core-operating means of the valve 34. Hence, when the valve 34 is opened, the valve 34B is concurrently opened, and vice versa.

A pressure regulator 100 is connected in series in the pressure line 101 leading to the motor 15. This regulator, in the manner customary in hydraulic systems, adjusts the hydraulic inlet line pressure to a predetermined value, for example, to a pressure lying between 2600 p. s. i. and 3050 p. s. i. and maintains this pressure in this range.

The pressure regulator 100 is a conventional hydraulic pressure regulator and since it constitutes no part of the invention itself, need not be described further than to state that, in the usual manner, pressure fluid from the pump 29 passes through line 101 and enters the port 102 in the T, which contains the usual dashpot check-valve (not shown). If this pressure is below, say 2600 p. s. i., the usual upwardly spring-loaded bypass valve, not shown but disposed vertically in the vertical portion of the regulator for controlling fluid return to the reservoir, remains seated. Fluid from pump 29 hence passes on through the check valve to the inlet side of the hydraulic motor 15.

The pressure which builds up in the hydraulic system and in the accumulator 103 also is applied to the regulator at port 104 through lines 105 and 106. When this pressure reaches a predetermined value, say 3000 p. s. i., it overcomes the spring of the usual spring loaded check valve (not shown) horizontally disposed in the arm 107 of the regulator and ordinarily blocking entry of fluid through port 104 into the vertical body of the regulator. Fluid then flows through the last said check valve onto the top of the usual spring loaded piston (not shown) capping the aforesaid vertically disposed by-pass valve in the vertical portion of the regulator, thereby moving said valve downwardly, which movement opens the by-pass port in which the lower end of the vertically disposed valve is seated. The check-valve in the T being closed, pump output hence passes vertically in the regulator and out of the port 108, through lines 109 and 110, and to the reservoir 28. The seating of the check-valve in the T holds the pressure in the system to the desired value.

When the pressure in the input line to the motor drops to a predetermined value, say 2600 p. s. i., the fluid is unable to overcome the usual spring loaded valve (not shown) in the arm 107, which valve instead now maintains the inlet 104 closed and prevents flow of fluid to the top of the spring loaded piston capping the by-pass valve in the vertical part of the regulator. At the same time, a horizontal passageway not shown, but in the usual manner extending through arm 107, is, by virtue of the lowered pressure in the upper part of the regulator that communicates with the port 104, now opened, allowing the fluid to pass through the arm 107 and port 111 and return to the reservoir through lines 112 and 110.

The pressure fluid inlet line also includes a pressure relief valve 29A connected by means of a by-pass line 29B, to the reservoir 28. Valve 29A automatically opens when the pressure of the fluid flowing through the motor inlet line builds up to a predetermined value in excess of the aforesaid exemplificatory 3050 p. s. i.

In Figure 2, all the parts are in a quiescent condition except the pump 29 which, although pumping hydraulic fluid continuously through the motor inlet line P, now returns the fluid to the source through the pressure relief valve 29A or the pressure regulator, as the case may be. The switch 37, configured with other parts hereinafter described for the purpose of controlling the motor starting and stopping valves 34 and 34B, is shown as resting on a node 36 and is hence in an open condition, interrupting all the electrical circuits shown connected thereto and hence positioning the valve 34 and 34B in the motor stopping position shown in solid lines. As a consequence of the stoppage of the motor, the ring gear 13 is stationary and consequently the doors are in their fully open or fully closed position.

In order to initiate the movement of the driving system and of the doors driven thereby, the motor is started by depressing the push-button E, forming the manipulatable part of an electrical switch having two poles H and K. Pole H is flow-connected, considering the flow electronically, to the negative side of a battery 39 through conductors 41A and 40, which battery, is also in divided circuit or in parallel connection connected by a conductor 42 to the negative pole of a solenoid 43, the purpose of which is later described. Pole K of the push-button switch is connected by a conductor 44A to a solenoid 45, which is also flow-connected by a conductor 47 to the positive pole of the battery 39. In divided circuit with conductor 47 is another conductor 48, parallel connected to a spring leaded clapper-plate 49 disposed confrontingly to the insulated plunger 46 of solenoid 45.

The clapper plate bears a laterally extending contact arm 50, adapted to make contact, on energization of solenoid 45, with a fixed contact 51 terminating a conductor 51A leading to the positive pole of solenoid 43.

Thus, momentary closure of switch E effects energization of solenoid 43 and retracts the plunger B thereof against the bias of a spring A. The outer portion of plunger B is pivotally connected to the arm C of a torque rod for positioning the core 34A of valve 34 and rotates the core into the dotted line position. This position enables the exhaust fluid from the motor to flow to the motor's cycle control valve 27 and thus re-establishes the flow of the pressure fluid through the motor 15 at a rate of flow, or with a power factor, that is controlled at predetermined phases of the rotation of the motor and of the ring gear 13, from maxima to minima by the hereinafter described fluid metering and flow-governing mechanism of the cycle control valve 27.

The motor now rotates in the clockwise direction, viewed from the fluid-inlet end, and rotates the ring gear in the clockwise direction.

With the roller and arm 38 now travelling on the smooth peripheral portions of the ring gear between the nodes 36, the switch 37 is in closed condition and the current, considered electronically, flows from source 39 through the conductor paths 40 and 41 to the switch 37. From the then closed switch, the current, electronically flows from source 39 through the conductor paths 40 and 41 to the switch 37. From the then closed switch, the current, electronically considered, flows through conductor path 44 to the negative pole of solenoid 45, solenoid 45 having, as aforestated, a core which is outwardly terminated by insulated cap 46. From the positive terminal of the solenoid, the current, electronically considered, passes to the battery through conductor 47. That part of the electronic energy which, instead of passing through conductor 41, divided and passed through conductor 42 now passes to the negative pole of solenoid 43 and thence to the positive pole thereof, changing polarity to positive, and maintaining the solenoid plunger in the position in which the push-button parallel circuit hereinabove described placed it, thereby to maintain the valve 34 open.

From the negative pole of the solenoid 43, the energy passes to the closed contacts 50 and 51, through the clapper plate 49, through conductor 48 and to the positive pole of the battery. The clapper plate and associated contacts are, of course, held, during this time, in their closed condition by the current in that circuit which includes the switch 37, conductors 44 and 44A, 47 and 41.

When the roller 38 is, as shown in Figure 2, in contact with one of the nodes 36, the circuit through the switch 37 from the source 39 via conductor 41 and the circuit to the solenoid 43 through the conductors 42 and 51A is broken. Hence the spring A outwardly biases the solenoid plunger B, and places arm C, carried at the lower end of the valve core torque rod D, in its rightward position, thus positioning the valve cores 34A and 34B in their solid line position. Such positioning stops the circulation of pressure fluid through the motor 15 and hence stops the motor and the doors in either their open or their closed position.

The ring gear is mounted on a support shaft 54 which bears a driving spur gear 55. The cycle control valve for the motor contains a rotary member 56 which terminates outwardly in a driven spur gear 57 meshed with gear 55 so that the control valve is rotated when the ring gear is rotated and stops when the latter is stopped, stoppage occurring every 180° of rotation of the ring gear because of the nodes 36 breaking the switch circuit, and eventually closing the motor starting and stopping valve 34 and stopping the motor.

The gear 55 meshes with the gear 57 at a ratio of the order of 2 to 1 so the gear 57 rotates twice when gear 55 rotates once. Since gear 55 rotates once while gear 14 is rotating four times, gear 57 rotates twice while the motor rotates four times and the rotor 56 rotates twice while the ring gear is rotating once. That is, the rotor 56 rotates in angular half-phase with the rotation of the ring gear 13.

The device 27 acts to control the rate of flow of the pressure fluid through the motor's rotor, or restricts the rate of energizing fluid flow therethrough, near the ends of the predetermined semi-circular arcs of rotation of the ring gear. While not entirely shutting off energizing fluid from the motor the device 27 reduces the velocity thereof and diminishes the pressure differential and also creates a back pressure on the motor that sets up a torque that meets the momentum of the doors. It thus causes the load to be moved with a low angular velocity at the terminal portion of the semicircular rotation of the ring gear so that the ring gear decelerates slowly with a relatively high mechanical advantage and thus stops its movement without sudden deceleration shocks or strains. Intermediate the aforesaid points on the rotary path of the ring gear, the motor control device 27 is effective to permit free flow of the exhaust fluid therethrough and hence exerts no back pressure on the motor exhaust line. The motor is thus enabled to exert its full power to rotate the ring gear member at its maximum angular velocity whereby to rapidly start the doors and quickly translate the doors from their initial position to a region near its terminal point, in which region the doors are slowed down.

To achieve these ends, the motor control means 27 may, according to this invention, assume any specific form suitable for controlling the rate of flow of the pressure fluid through the motor and for creating a back pressure on the motor exhaust at predetermined points in the cycle of operation of the load member and of the motor, usually at the end of every two rotations of the latter. In the illustrative form shown in the drawings the control device 27 consists of a fluid metering and inlet governing valve having a rotary member for metering the fluid so shaped and so configured with its outlet as to restrict flow therethrough, and hence control the rate of flow through the system, at certain predetermined phases of its rotation, this member being operationally combined with a lineally movable governor valve responsive to these outlet constrictions to, in turn, constrict the inlet into the metering valve.

Figure 5:
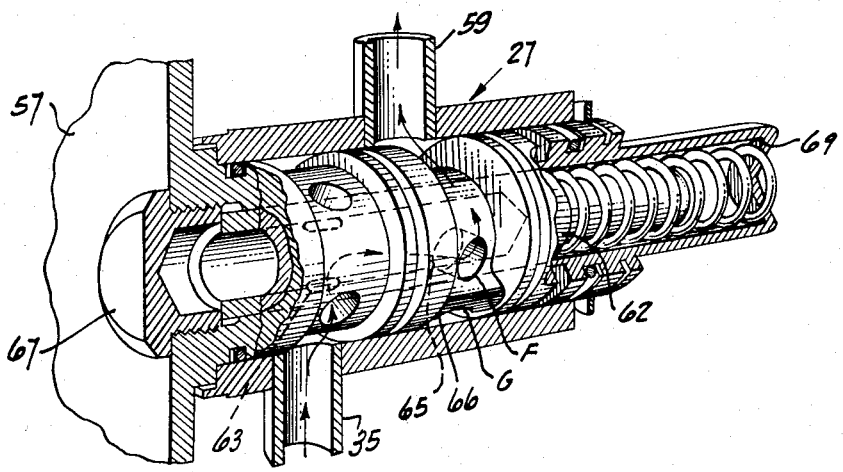
Figure 5 is a perspective, partly broken away and partly in section, of this motive power controlling device.

More specifically, the cycle control valve comprises a rotary hollow member in the form of a valve rotor 56 mounted coaxially of a casing 57A. The rotor is adapted to be driven by a spur gear 57 shown diagrammatically in Figure 4 and is held in the casing at the one end thereof by a retainer ring 100A and at the other end thereof by the rotor driving gear 57 and the associated hub or shaft thereof. The casing has an inlet 58 connected to the motor exhaust line 33 through port pipe 35 and an outlet pipe 59 returning the pressure fluid which has passed through the fluid metering valve, to the source 28. The rotor 56 has an annular inlet passage 60 surrounding the rotor near the one end thereof and an annular outlet passage 61 near the other end. The central portion of the rotor is hollow and bears a spring loaded plunger unit 62, later more fully described. Suffice it now to say that member 62 has inlet ports 63 communicating with inlet ports 64 in the bottom of the annulus 60 and passes fluid to outlet ports 65 which communicate with an outlet port F lying in the bottom of the annulus 61, formed in the rotor 56. The inner side or face of outlet passage 61 is spirally formed as shown most clearly in Figures 3 and 5, that is, is provided with a gradual radial enlargement 66. A kerf or groove G is formed in the outer periphery of the peak portion of the rotor to prevent total closure of the outlet 59 when the peak registers with said outlet, thereby to permit enough pressure fluid to flow through the motor to prevent the latter stopping until stopped by the "stop-start" valve 34. During rotation of the rotor, enlargement 66 passes the outlet 59 of the valve casing once every 360° of rotation of the rotor and in close radial relation thereto, and thus constricts outlet 59, as well as spirally constricting the passage available for the fluid to flow from the rotor to the outlet of the casing.

The plunger 62, coaxially mounted slidably in the rotor, is a hollow, tubular spring-loaded member closed at the one end and normally abutting at the other end against a plug 67 screwed into that end of the hollow rotor. It is adapted to serve as a governor or pressure regulator. This reciprocatable core member is spring loaded at the outer end by a spring 69 which resists its movement when the plunger is urged by the pressure fluid rightwardly. When the outlet 59 is almost fully obturated, the ports 63 are left partially open so that there remains a small amount of flow through these ports and kerf G to the motor energizing fluid-circuit. When the plunger is spring-urged fully leftward, the ports 64 and 63 are fully flow-connected for establishing full flow through the motor energizing circuit. The spring 69 has a rate so coordinated with the pressure value of the operating fluid that when the inlet pressure is excessive, plunger 62 and ports 63 will move rightward to meter the flow and reduce the fluid pressure to the proper value.

The rotor outlet or port F is disposed near the maximum ordinate, point of inflection, or peak 68 of the spiral periphery of the rotor and lies on the trailing side thereof, or after the peak 68.

Thus, the passage of fluid from the casing inlet through the rotor and out of the casing outlet is most unrestricted during the first 180° of rotation of the rotor. The passage for the outlet of fluid from the rotor, lying between the rotor periphery and the inner periphery of the casing, thereafter becomes gradually restricted as the rotor turns, clockwise as seen in Figure 3, toward the casing outlet and the peak 68 of the rotor finally reduces to the minimum the exit of fluid from the casing. It accomplishes this blocking action once in one revolution of the rotor, thus creating and applying a back pressure on the motor exhaust twice during each rotation of the ring gear. When the peak of the rotor approaches the casing outlet and restricts fluid outflow through the pressure outlets 65 and F pressure builds up in the governor member 62 and gradually overcomes the spring load thereon and urges the governor toward the spring until the inlet 63 therein no longer communicates completely with the inlet 64 in the valve rotor. Such positional dephasing impedes the entry of motor exhaust fluid into the metering valve 56, applies back pressure to the motor's rotor and effects the aforedescribed rotation controlling action on the motor and consequently on the ring gear and hence moves the doors as aforedescribed. As aforementioned, however, this action of the peak and governor-slide occurs only near the end of the 180° arc of travel, or near the terminal positions, of the ring gear rotation. Intermediate these terminal positions the full effect of the motor's power created by the full flow of the pressure fluid acts to rotate the ring gear rapidly from just beyond the starting point to just ahead of the terminal point. For, at this time, the peak 68 is out of registry when the casing outlet and the ports in the governor member are properly and freely in registration with both the casing inlet and the rotor outlet and the casing outlet ports. Thus the exhaust fluid passes freely through the core and the rotor without exerting any unbalanced force on either. The outlet of exhaust fluid from the motor is thus left unaffected and unrestricted and the motor hence rotates at its full velocity and with relatively low torque in the purely transitory phase of its rotation.

Various substitutions of equivalent elements for those described hereinabove may be made within the scope of the present inventive concepts without departing from the ambit of the annexed claims.

I claim:

1. A control system for fluid-energized prime-movers, comprising: a fluid-energized prime-mover; a cyclically moved member drivenly connected to said prime-mover; a source of pressure fluid; a fluid-conductor path interposed between said source and said prime-mover and having respective source-connected portions leading respectively to, and from, said prime-mover; valvular means for cutting-off and establishing flow through said path operatively interposed in said path; an independent source of energy; activator means spaced at predetermined sub-cyclic intervals with respect to said cyclically moved member so as to be rendered active by the latter; means for operating the means for controlling fluid flow through said fluid path, said means-operating means normally being in energy-flow communication with the independent energy source in that energy-flow receiving condition that effects opening of said means for controlling said pressure fluid-flow through said fluid path; a normally closed energy-flow interrupting means flow-connected in circuit with the independent source and to said fluid flow-controlling means and so disposed with reference to said activator means as to be operated thereby and in turn operate said interrupting means and position said fluid-flow controlling means in an attitude that de-energizes said prime-mover; control means for controlling the flow rate and power factor of the flow of the prime-mover energizing fluid operatively disposed in said pressure-fluid path and so organized with said cyclically moved member as to phase the energizing fluid flow through said prime-mover into phases terminating with the termination of the sub-cyclic phases of said cyclically moved member, thereby halting said prime-mover at the ends of said sub-cyclic phases; and normally inactive auxiliary energy flow conducting means flow-connected in circuit with said independent energy source and adapted to be activated, to open the aforesaid means for controlling pressure-fluid flow through the fluid path to said prime-mower, when the energy communication between the independent energy source and the means for operating said valvular means that cut-off and establish fluid flow is disestablished by the activator means associated with the cyclically moved member.

2. A control system for fluid-energized prime-movers, comprising: a fluid-energized prime-mover; a cyclically moved member drivenly connected to said prime-mover; a source of pressure fluid; a fluid-path interposed between said source and said prime-mover and having respective source-connected portions leading respectively to, and from, said prime-mover; valvular cut-off and opening means for controlling flow through said fluid-path operatively interposed in said path; a source of electrical energy; activator means spaced at predetermined sub-cyclic intervals with respect to said cyclically moved member so as to be rendered active by the latter; means for operating the means for controlling fluid flow through said fluid path, said means-operating means normally being flow-connected in circuit with said electrical energy source in a flow-direction that causes said energy to open said means for controlling said fluid flow through said path; a normally closed electrical energy-flow interrupting means flow-connected in circuit with said energy source and with said means-operating means and so disposed for operation by said activator means as to effect operation of said interrupting means and position said fluid-flow controlling means in an attitude that normally de-energizes said prime-mover; valvular control means for controlling the flow-rate and power-factor of the prime-mover energizing fluid operatively disposed in said fluid path and so organized with said cyclically moved member as to phase the flow of said energizing fluid into phases terminating with the termination of the sub-cyclic phases of movement of the cyclically moved member, thereby halting said prime-mover at the ends of said sub-cyclic phases; and a normally open electrically energized circuit-means connected with said independent energy source and with said means-operating means and adapted to be closed, to effect opening of the aforesaid means for controlling fluid flow rate, when the energy-communication between said energy source and the means for operating said valvular cut-off and opening means is disestablished by the activator means associated with the cyclically moved member.

3. A control system, comprising: a hydraulic prime-mover; a cyclically movable member and the prime-mover; a driving connection between said movable member and the prime-mover; a source of pressure fluid; a pressure-fluid path having a portion leading into said prime-mover from said source and having another portion leading from said prime-mover to said source; a valvular flow-path opening and closing means operatively interposed in said fluid path; a source of energy; activator-means spaced at predetermined intervals with respect to the path of movement of said cyclically movable member for actuation by the latter, said intervals corresponding to sub-cycles of the cyclic motion of said cyclically movable member; means for actuating said valvular means and including a normally outwardly biased member configured with said valvular means in such angular relationship to said valvular means as to enable the means actuating means to apply closing and opening forces thereto, said means actuating means normally being flow-connected in circuit with said energy source in a flow-direction that effects retraction of said outwardly biased member to open said valvular means; a normally closed energy-flow interrupting means flow-connected to the independent source and connected to said means-actuating means and having a portion disposed in operative adjacency to said activator means so as to effect actuation of said interrupting means by said activator means thereby to de-energize said means-actuating means and enable outward biasing of said member, thereby to de-energize said prime-mover; other valvular means for controlling the prime-mover energizing fluid operatively disposed in said fluid path and including means drivenly connected to the cyclically movable member to be so moved as to control said fluid in phases terminating with the termination of the sub-cyclic phases of said cyclically movable member, thereby to control the flow of fluid through said prime-mover from a maximum at the beginning of each sub-cycle to a minimum at the end of each sub-cycle, and applying a fluid force at said end to said prime-mover sufficient to bring it to rest; and an auxiliary, valve actuator energizing energy-flow conducting means paralleled in the energizing path extending from the first said energy source to said means-actuating means and including means operable to close said energizing path and to so move said means-actuating means as to effect opening of the fluid-flow path through the prime-mover and start the latter.

4. A control system, comprising: a hydraulic prime-mover; a cyclically movable member; a driving connection between said movable member and the prime-mover; a source of pressure fluid; a pressure fluid path having a portion leading into said prime-mover from said source and having another portion leading from said prime-mover into said source; valvular flow-path opening and closing means operatively interposed in said fluid path; a source of energy; tripper means located at predetermined sub-cyclic intervals with respect to the cyclic trace of movement of said cyclically movable member, said intervals defining and terminating sub-cycles of the cyclic motion of said member; actuator means for actuating said valvular means and including a normally outwardly biased member connected with said valvular means in such angular relationship therewith as to enable it to apply closing and opening moments thereto, said actuator means being normally flow-connected with said energy source in a flow-establishing direction that effects retraction of said outwardly biased member to open said valvular means; a normally closed energy-flow interrupting means connected to said energy source and to said valve-actuator means and having a portion disposed in operative adjacency to said cyclically moved means for actuation of said interrupting means by said tripper means thereby to de-energize said valve actuator means and enable outward biasing of said member, whereby to stop said prime-mover; means for controlling the prime-mover energizing fluid flow rate through said fluid path, said means being flow-connected in said fluid path beyond said valvular means and phasing said fluid flow in phases the terminations of which coincide with the terminations of the sub-cyclic phases of said cyclically movable member, thereby to control the flow of fluid through said prime-mover from a maximum flow at the beginning of each sub-cycle to a minimum at the end of each sub-cycle and, at the latter end, to apply a force to said prime-mover sufficient to gradually decelerate it to substantially zero angular velocity; and normally open auxiliary energy flow conducting means, for energizing said valve-actuator when the first-said energy path from said independent source to said valve-actuator is opened by said tripper means, paralleled in the energizing path extending from said energy source to said valve-actuator and including a member manipulatable to close said auxiliary flow-path, thereby to activate said valve-actuator in that direction which opens the fluid-flow path through the prime-mover and re-starts the latter.

5. A control system, comprising: a hydraulic prime-mover; a cyclically movable member; a driving connection between said movable member and the prime-mover; a source of pressure fluid; a pressure fluid flow-path leading into said prime-mover from said source; an exhaust fluid flow path leading from said prime-mover to said source; a prime-mover stopping and starting valve operatively interposed in said exhaust fluid path and including a rotatable core having a fluid-passage therethrough registrable and deregistrable with the adjacent ends of said exhaust fluid path, thereby to energize and de-energize said prime mover; another source of energy, independent of said pressure source; tripper means located at predetermined intervals on the periphery of said cyclically movable member, said intervals defining and terminating sub-cycles of the cyclic motion of said member; valve-actuator means, including a normally outwardly biased member connected with said core in such angular relationship thereto as to apply exhaust path de-registering and exhaust path registering torque thereto, said actuator means being normally flow-connected with said independent energy source in a flow-direction effective to retract said outwardly biased member and effecting said registration; a normally closed fluid-flow interrupting means connected to said independent source and to said valve-actuator means and having a portion disposed in operative adjacency to said periphery for actuation of said interrupting means by said tripper means thereby to de-energize said valve-actuator means and enable outward biasing of said member, thereby to halt said prime-mover; valvular prime-mover-fluid flow rate controlling means flow-connected in said fluid-path beyond said valvular means and having an outlet restrictor drivenly connected to said cyclically movable member for restrictively metering said fluid flow in phases the terminations of which coincide with the terminations of the sub-cyclic phases of said cyclically-movable member, thereby to control the flow of fluid through said prime-mover from a maximum flow at the beginning of each sub-cycle to a minimum flow at the end of each sub-cycle and at the latter to apply a back-pressure sufficient to gradually decelerate said prime-mover to immobility; and normally open auxiliary energy flow conducting means, for energizing said valve-actuator when the first-said energy path to said valve-actuator is opened, paralleled with the energizing path extending from said energy source to said valve-actuator and including a member manipulatable to close said auxiliary flow-path, thereby to activate said valve-actuator in that direction which opens the fluid-flow path through the prime-mover and re-starts the latter.

6. A control system, comprising: a hydraulic prime-mover; a cyclically movable member; a driving connection between said movable member and the prime-mover; a source of pressure fluid; a pressure fluid flow-path leading into said prime-mover from said source; an exhaust fluid flow path leading from said prime-mover to said source; a prime-mover stopping and starting valve operatively interposed in said exhaust fluid path and including a rotatable core having a fluid-passage therethrough registrable and de-registrable with the adjacent ends of said exhaust fluid path, thereby to energize and de-energize said prime mover; a source of electrical energy; a solenoid normally flow-connected to said source for energization thereby, said solenoid including a normally retracted plunger; a torque rod attached at its inner end to said core; a lever arm attached at its inner end to the torque rod and pivotally attached at its outer end to said lever arm; tripper means located at predetermined intervals on the periphery of said cyclically movable member, said intervals defining and terminating sub-cycles of the cyclic motion of said member; a normally closed energy-flow interrupting means connected in circuit with said electrical source and with said solenoid and having a portion disposed in operative adjacency to said periphery for actuation by said tripper means, thereby to de-energize said solenoid and position said core in a prime-mover stopping position; valvular prime-mover energizing fluid flow rate controlling means flow-connected in said fluid-path beyond said valvular means and having an outlet-restrictor drivenly connected to said cyclically movable member for restrictively metering said fluid flow in phases terminating in coincidence with the terminations of the sub-cyclic phases of said cyclically-movable member so as to control fluid flow through said prime-mover from a maximum at the beginning of each sub-cycle to a minimum at the end of each sub-cycle and at the latter juncture to apply a back-pressure sufficient gradually to bring said prime-mover to rest; and normally open energy-flow conducting means adapted to energize the valve-actuator when the first-said energy path to the valve-actuator is opened, said normally open conducting means being circuit-paralleled with the energizing path extending from said energy source to said valve-actuator and including a member manipulatable to close said auxiliary flow-path, thereby to activate said valve actuator in that direction which opens the fluid-flow path through the prime-mover and re-starts the latter.

7. A control system, comprising: a hydraulic prime-mover; a cyclically movable member; a driving connection between said movable member and the prime-mover; a source of pressure fluid; a pressure-fluid flow-path leading into said prime-mover from said source; an exhaust fluid flow path leading from said prime mover to said source; a prime-mover stopping and starting valve operatively interposed in said exhaust fluid path and including a rotatable core having a fluid-passage therethrough adapted to be registered and de-registered with the said exhaust fluid path, thereby to respectively energize and de-energize said prime-mover; a source of electrical energy; a solenoid normally flow-connected to said source for energization thereby, said solenoid including a normally retracted plunger; a torque rod attached at its inner end to said core; a lever arm attached at its inner end to the torque rod and pivotally attached at its outer end to said lever arm; a plurality of actuator nodes equidistantly arranged on the periphery of said cyclically movable member, said intervals defining sub-cycles of the cyclic motion of said member; a normally closed energy-flow interrupting electric switch connected in circuit with said electrical source and with said solenoid and having a portion disposed in operative adjacency to said periphery for actuation by said nodes, thereby to periodically interrupt energy flow to said solenoid at the terminations of the sub-cycles of said cyclically movable member, whereby to de-energize said solenoid and effect closing of said exhaust path and stop said prime-mover; other valvular means adapted to directly meter and control the flow rate of prime-mover energizing fluid, said other valvular means being operatively disposed in said fluid path beyond the first said valvular means and having an outlet-restrictor drivenly connected to said cyclically movable member for restrictively metering said fluid flow in phases terminating in coincidence with the terminations of the sub-cyclic phases of said cyclically movable member so as to control fluid-flow through said prime-mover from a maximum at the beginning of each sub-cycle to a minimum at the end of each sub-cycle and at the latter juncture to apply a back-pressure sufficient gradually to bring said prime-mover to rest; and normally open energy-flow conducting means adapted to energize the valve-actuator when the first-said energy path to the valve-actuator is opened, said normally open conducting means being circuit-paralleled with the energizing path extending from said energy source to said valve-actuator and including a member manipulatable to close said auxiliary flow-path, thereby activate said valve-actuator in that direction which opens the fluid-path through the prime-mover and re-starts same.

8. A control system, comprising: a hydraulic prime-mover; a cyclically movable member; a driving connection between said movable member and the prime-mover; a source of pressure fluid; a pressure-fluid path having a portion leading into said prime mover from said source and having another portion leading from said prime-mover into said source; valvular flow-path opening and closing means operatively interposed in said other portion of said fluid path; another source of energy, independent of said pressure fluid source; tripper means located at predetermined intervals on the periphery of said cyclically movable member, said intervals defining and terminating sub-cycles of the cyclic motion of said member; electrically energized valve-actuator means, including a normally outwardly biased member connected with said valvular means in such angular connection-moment arm relationship therewith as to apply closing and opening forces thereto, said actuator means including an electrically actuatable component normally in energy-flow communication with said independent energy source in that energy-flow direction that effects operation of the electrical component one retraction of said outwardly biased member to open said valvular means; a normally closed energy-flow interrupting means connected to said independent source and to said valve-actuator means and having a portion disposed in operative adjacency to said periphery for actuation of said interrupting means by said tripper means thereby to de-energize said valve-actuator means and enable outward biasing of said member, thereby to halt said prime-mover; rotary prime-mover-fluid flow metering and governing means flow-connected in said other portion of said fluid path beyond said valvular means and having a rotatable outlet-restrictor drivenly connected to said cyclically movable member to be rotated thereby so as to restrictively meter said fluid flow in phases the terminations of which coincide with the terminations of the sub-cyclic phases of said cyclically movable member, thereby to control the flow of fluid through said prime-mover from a maximum flow at the beginning of each sub-cycle to a minimum flow at the end of each sub-cycle and to apply, at the end of each sub-cycle, a back-pressure sufficient to gradually decelerate said prime-mover to immobility; and normally open auxiliary energy-flow conducting means adapted to be closed for energizing said valve-actuator when the energy flow communication between said independent source and said actuatable component is opened by said tripper means, said auxiliary flow-conducting means being paralleled in the energizing circuit connecting said energy source, with the interrupter-actuating member and the valve-actuating means and including a member manipulatable to close said auxiliary flow-conducting means thereby to activate said valve-actuator in that direction which opens the pressure fluid flow path through the prime-mover and re-starts the latter.

9. A cyclically operable control system, comprising: a hydraulic prime-mover; a source of pressure fluid; means forming a fluid flow path from said source to said prime-mover and from said prime-mover back to said source; a cyclically movable work-performing member driven by said prime-mover; valve means interposed in said fluid flow path to control the flow of fluid through said prime-mover; means operatively connected with said interposed valve means for operating said valve means so as to stop flow therethrough to said prime-mover; means carried by the work-performing member and arranged to operate said valve-operating means at sub-cyclic phase-ends of the cyclic work-performing member; manually operable means to produce opening of said valve means to actuate said prime-mover and initiate a cycle of movement of said driven member; rotary, spirally restrictive flow-rate controlling valve means interposed operatively in said flow path and operable by said driven member so as to restrict the peripheral flow thru said valve means in phase with said driven member and means actuated by the approach of said driven member to the end of its cycle of movement to produce closing of said valve means to stop said prime-mover and terminate the cycle of movement of said driven member.

10. A control system as claimed in claim 9 and, in which said flow rate controlling means is self-contained and includes a rotary obturator rotatably associated with and driven in phase by said driven member, the obturator having a casing and a peripheral formation mutually co-operative to restrict the peripheral fluid flow thru said casing to said prime-mover, said flow rate controlling means being operable to provide a full flow fluid passage in the first portion of each cycle of movement of said driven member and a gradually increasingly restricted flow fluid passage in the latter portion of each said cycle of movement; whereby said prime-mover will operate at full speed at the beginning of each cycle and gradually decelerate to substantially zero rate of movement as the end of each cycle is approached.

11. A control system as claimed in claim 9 and, in which said flow-rate controlling device includes a rotary restrictor member having a flow-restrictive formation formed incrementally on a portion of its periphery for decrementally altering the cross-sectional area of the peripheral flow-path thru said flow-rate controlling device, said rotary restrictor member being driven by and movable in phase with said driven member; said restrictor member being movable from a position providing substantially full fluid flow during the initial portion of the cycle of movement of said driven member to positions gradually increasingly restricting the fluid flow during the terminal portion of said cycle of movement to decelerate said prime-mover and prevent shock in the system upon closing of said valve means.

12. In a control system for a hydraulic motor that is pressure-and-exhaust connected to a source of pressure-fluid and adapted to be so operated by control of said fluid as to sub-cyclically drive a cyclically movable load, a prime-mover-cycle control valve for periodically controlling the rate of flow of said fluid through said motor, comprising: a casing interposed in the fluid path and having ports flow-connected with a fluid source and with said motor so as to enable said fluid to drive same; a member rotatably mounted in said casing with lateral, or radial, clearance therebetween, said rotatable member having a lateral-clearance restrictive member incrementally formed on a portion of its periphery and adapted to periodically register with the one of said ports to meter fluid therethrough and minimize the fluid flow-rate through said motor; and means so drivingly connecting said rotatably mounted member to the cyclically driven load as to effect continuous rotation of said member in phase with said load and move the restrictive member cyclically from a minimum restrictive position to a terminal position effecting maximum restriction and registering the maximal incremental portion of said rotating member with the one of said ports at the ends of phases of movement of said rotatably mounted member that terminates slightly in advance of the end of sub-cyclic phases of movement of said cyclically movable member, whereby to diminish the rate of flow of fluid through said motor thereat sufficiently to substantially halt movement thereof and of said load at the ends of subcyclic phases of movement thereof.

13. In a control system for a hydraulic motor that is pressure-and-exhaust connected to a source of pressure-fluid and adapted to be so operated by control of said fluid as to sub-cyclically drive a cyclically movable load, a prime-mover-cycle control valve for periodically controlling the rate of flow of said fluid through said motor, comprising: a casing interposed in the fluid path and having an inlet port flow-connected with the exhaust fluid from said motor and having an outlet port connected to the reservoir for the fluid; a member rotatably mounted coaxially in said casing, the casing and the member being spaced apart with general peripheral clearance and the rotary member having clearance-restrictive means formed incrementally on a portion of its periphery for decrementally altering the clearance between said rotary member and said casing, said clearance restrictive means being adapted to register with said outlet to cause restriction of flow through said casing in phases lying in advance of the end of sub-cyclic phases of movement of said cyclically movable member so as to diminish the rate of flow of the fluid through the motor; and means so drivingly connecting said movably mounted member to the driven load as to effect continuous cyclic rotation of said member in phase with said load and move said restrictive member cyclically from a minimum restrictive position to a terminal position effecting maximum restriction and registering the maximal incremental portion with said inlet port at the ends of phases of movement of said movable member that terminate slightly in advance of the end of the sub-cyclic phases of movement of said cyclically movable member.

14. A fluid metering valve comprising: a casing having an inlet port adapted to be connected to the exhaust of a fluid-driven prime-mover and having an outlet port; a hollow rotary member disposed coaxially of said casing and having an inlet normally communicating with the casing inlet port and an outlet normally fully flow connected with the casing outlet port, the periphery of said rotary member having a spiral shape with its maximum radius located substantially immediately ahead of the outlet in said rotary member and defining with said casing an outlet passage communicable with the casing outlet port and the width of which with relation to said outlet port reaches a maximum and a minimum at predetermined points of the rotation of said rotary member, the peak defined by said maximum radius constricting said outlet port sufficiently to create back pressure longitudinally in said rotary member at said predetermined points; and a governor member for restricting inlet of prime mover exhaust fluid disposed coaxially and movably of said rotatable member and spring biased inwardly at the one end thereof and having a hollow fluid passageway therein and having inlet and outlet ports longitudinally spacedly arranged in the walls thereof and communicating respectively with the hollow passageway and respectively with the inlet and outlet of said rotary member and said governor member being subjected to said back pressure in said rotatable member to effect movement thereof in a direction effecting restriction of entry of fluid into said rotary member and creating back pressure at said casing inlet port.

15. A fluid metering valve, comprising: a casing having fluid inlet and outlet ports; a rotary member mounted coaxially of the casing and having inlet and outlet ports and including a spirally shaped peripheral portion including a peak portion radially registering with said casing outlet port, at predetermined phases of the rotation of the rotary member, in sufficient radial adjacency to constrict outflow therethrough; and a hollow fluid-receiving elongate spring-biased member slidably mounted coaxially in said rotary member and having in its walls ports longitudinally spaced and respectively flow-connected to the aforesaid hollow and respectively to the inlet and the outlet respectively of the rotary member; whereby said constriction of said outflow creates sufficient back pressure to effect displacement of said slidable member relatively to said casing inlet in a direction such as to restrict fluid inlet flow into said inlet and apply back pressure on fluid entering said inlet.

16. A control valve for a fluid driven prime mover, comprising: an elongate enclosure having ingress and egress means; an elongate rotary member, adapted to be rotatively driven by a prime mover, said rotary member being disposed coaxially of said casing and having ingress means normally communicating with the driving fluid exhaust of said prime mover and egress means normally communicating with the egress means in said enclosure; a spirally radially enlarged portion disposed on the periphery of said rotary member in a location relative to said egress means in said enclosure such as to bring the maximum radius portion of said enlargement into radial registry with said egress means at predetermined phases of the rotation of said energy member, said registry being adequate to constrict the outflow through said egress means; and governor means mounted coaxially of said rotary member and having an inlet means normally communicating with the inlet means of said rotary member and the ingress means of said enclosure to establish flow through said control valve and including a spring inwardly biasing the outer end of said governor means and overcomable by the back pressure created in the governor means by said predetermined phased restrictions of said egress means to deregister the ports in said governor means and said rotary member and apply back pressure to the fluid entering said ingress means.

17. A control valve for a pressure-fluid driven prime-mover, comprising: an elongate enclosure having ingress and egress means therein; an elongate hollow rotary member, drivingly connected to said prime-mover to be rotatively driven by the prime-mover, disposed coaxially of said enclosure and having ingress means normally communicating with the exhaust fluid from said prime-mover and including egress means normally communicating with the egress means of said enclosure; an outflow passage wall disposed on the periphery of said rotary member and having its periphery lying radially adjacent the wall of said enclosure means at gradually radially diminishing distances from the adjacent enclosure wall starting at a point rotatively located immediately behind the egress from said rotary member and terminating at a point of maximum radial enlargement rotatively located immediately ahead of the egress from said rotary member, said point registering radially with the enclosure egress at predetermined phases of the rotation of said rotary member; inflow governing means movably disposed coaxially of said rotary member and including an ingress normally communicating with the ingress to said enclosure and including an egress communicating with the egress in said rotary member, said inflow governing means having a longitudinally active biasing means therefor disposed adjacent the one end thereof in said rotary member in an attitude normally maintaining the governor ingress means and the enclosure ingress means in communication, said inflow governing means being responsive to the back pressure consequent upon said registration of said point of said rotary member with the egress means in said enclosure and movable by said pressure in a direction restricting entry of fluid from said prime mover into said valve whereby to create velocity diminishing back pressure on said prime mover.

18. A control valve for periodically controlling the maximum and minimum flow rate in a pressure fluid supply and return conduit system of a hydraulic motor driven by said fluid and for creating back pressure in the motor exhaust portion of said conduit system, comprising: an enclosure having ingress and egress means therein; a rotary member disposed coaxially of said enclosure and including ingress means normally communicating with the full pressure of said fluid and including egress means normally communicating with the egress means of said enclosure; an outflow passage wall disposed peripherally of said rotary member at gradually radially diminishing distances from the adjacent wall of said enclosure means starting at a point rotatively located immediately behind the egress from said rotary member and terminating at a point of maximum radial enlargement rotatively located immediately ahead of said egress from said rotary member, said point lying in radial registry with the enclosure egress at predetermined phases of the rotation of said rotary member; means governing inflow into said valve from said pressure fluid line disposed coaxially of said rotary member and including ingress means normally communicating with the ingress to said enclosure and having egress means communicating with the egress means in said rotary member, said governing means including a longitudinally active biasing means therefor disposed adjacent to the one end thereof in said rotary member and normally maintaining the governor ingress means and enclosure ingress means in communication, said governor means being movably responsive to back pressure consequent upon said registration of said point of said rotary member with the egress means in said enclosure in a direction restricting entry of fluid from said pressure fluid line into said valve whereby to create back pressure in the exhaust portion of said pressure fluid line and apply it to said motor to predeterminedly diminish the rotational velocity thereof.

19. A control valve for periodically controlling the maximum and minimum flow rate in a pressure fluid supply and return conduits system to a hydraulic motor driven by said fluid and for creating back pressure in the motor-exhaust portion of said system, comprising: an elongate casing having an inlet port near the one end thereof and an outlet port near the opposite end thereof; an elongate hollow rotary member disposed coaxially of said casing and drivenly connected to said motor and including an annular inlet passageway near the one end thereof having radially inwardly directed ports in its bottom wall normally communicating with the full pressure of said fluid, said rotary member having a radially directed outlet port longitudinally outwardly displaced from said annular passageway and normally communicating with the outlet port in said casing, the periphery of said rotary member in the region of the outlet port therein, and starting at the rotatively rearward side of said port, gradually increasing radially outwardly from a minimum to a maximum lying at the rotatively forward side of said port and constituting with said casing a spiral valve in the region of the outlet therein, said maximum radius lying in radial registry with said outlet port in said casing at predetermined phases of the rotation of said rotary member; a hollow elongate member slidably mounted coaxially of said rotary member and including radially extending ports normally communicating with the radially extending ports in said rotary member and said slidably mounted member including radially extending ports located outwardly longitudinally from the first said ports and communicating with the outlet port in said rotary member; and a helical spring interposed between the outer end of said slidable member and the adjacent end of said rotary member and normally biasing said slidable member against the inflow pressure sufficiently to maintain the ports in said rotary member and the corresponding ports in the slidable member in communication and said spring bias being designed to be overcomable by the back pressure in said slidable member consequent upon said registration thereby to decommunicate the inlet ports in the rotary member and the inlet ports in the slidable member sufficiently to create back pressure in the incoming fluid in said fluid line and apply it to said motor to diminish the rotational velocity thereof.

20. A valve, comprising: a casing having inlet and outlet ports; a hollow relatively rotatable body coaxially mounted in said casing and having inlet and outlet ports communicating with those in the casing; the body and the casing being coaxial and spaced apart transversely thereof; means formed radially incrementally from substantial equality with the radius of said body and enlarging radially into contact with said body and lying radially between said inlet port and said outlet port of said casing, said means being arranged as aforesaid on the periphery of said rotatable body for decrementally altering the peripherally extending lateral clearance between same and the casing; and means coaxially slidably mounted in said rotatable body and flow-communicating with the inlet and outlet ports in said casing, the aforesaid mounted means having a hollow ported body and communicating with said ports in the first said body and in such casing through said ports in said hollow body; and actuatable by said decremental alteration so as to cause said mounted means to longitudinally slide in said rotatable body and register laterally with and constrict the inlet port in said casing thereby to effect metering of flow into said body thru said casing.

21. A controlled mechanical movement system, comprising: a fluid energized prime mover having an inlet and an outlet; a cyclically rotary load member drivenly connected to said prime mover at a fixed drive-ratio; a source of pressure fluid; a fluid conduit connecting said source and the inlet of said prime mover; a conduit connecting said outlet and said source; normally open, mutually coordinated means in each of said conduits for concurrently controlling outflow in said exhaust conduit and inflow in said supply conduit; activator means moved by said cyclically rotary load member; means connected to said flow-controlling means for normally maintaining the aforesaid flow-controlling means in said conduits in an open flow-establishing condition, said maintaining means being operable to effect closing and flow-disestablishing movement of said flow-controlling means in said conduits; actuatable means connected to said means that operate the flow-controlling means, said actuatable means being arranged to be directly operated by said activator means; cycle-control means drivenly connected to said load member and interposed operatively in the exhaust path of said prime mover for controlling the flow rate and power factor of the fluid passing out of the prime-mover so as to phase the flow of said fluid through the prime-mover into phases terminating with the ends of the sub-cyclic phases of the cyclically moved load member; and normally inactive means operatively connected to the aforesaid means for controlling pressure fluid flow thru said fluid conduits of said prime-mover, said normally inactive means being adapted to be activated to operate and open said flow-controlling means to permit flow to the prime-mover when said activator means is effective to de-activate said means for operating said flow-controlling means, thereby to restart said prime mover.

22. A control valve for a pressure-fluid driven prime-mover, comprising: an enclosure having an inlet and an outlet; a hollow rotary member disposed in said enclosure and rotatably drivenly connected to said prime-mover, said hollow rotary member having ingress means normally connected to prime-mover exhaust and having egress means normally connected to said enclosure's outlet; an outflow restrictive surface disposed peripherally of said rotary member, said surface lying generally radially adjacent the wall of the enclosure and having successive loci thereon successively lying at gradually radially diminishing distances from said wall; fluid inflow-governing means movably mounted in said hollow rotary member and including an inlet port normally communicating with the enclosure's inlet, said governing means including an outlet communicating with the egress means in said rotary member; a longitudinally active biasing means disposed adjacent one end of said governing means and effective on same so as to normally maintain the inlet in said governing means in communication with the inlet of said enclosure; and means applying the fluid back pressure generated by registration of said flow restrictive surface with the enclosure's outlet to the opposite end of said governing means so as to move the latter in that direction which restricts entry of exhaust fluid from the prime mover into said control valve; whereby to apply velocity-diminishing back pressure from the valve to said prime mover in predetermined cycles correlated with the cycles of said prime mover.

References Cited in the file of this patent

UNITED STATES PATENTS

| | | |
|---|---|---|
| 1,281,543 | Farmer | Oct. 15, 1919 |
| 1,431,248 | Norris | Oct. 10, 1922 |
| 1,740,877 | Sharp | Dec. 24, 1929 |
| 1,757,439 | Roye | May 6, 1930 |
| 1,957,697 | Conway | May 8, 1934 |
| 2,164,876 | Horlacher | July 4, 1939 |
| 2,401,397 | Wright | June 4, 1946 |
| 2,434,835 | Colley | Jan. 20, 1948 |

FOREIGN PATENTS

| | | |
|---|---|---|
| 321,709 | Italy | Oct. 13, 1934 |
| 551,205 | Germany | May 28, 1932 |
| 476,590 | Great Britain | Dec. 13, 1937 |
| 659,746 | Great Britain | Oct. 24, 1951 |